Feb. 20, 1945.  H. T. AVERY  2,369,652
HELICOPTER
Filed July 14, 1941  5 Sheets-Sheet 1
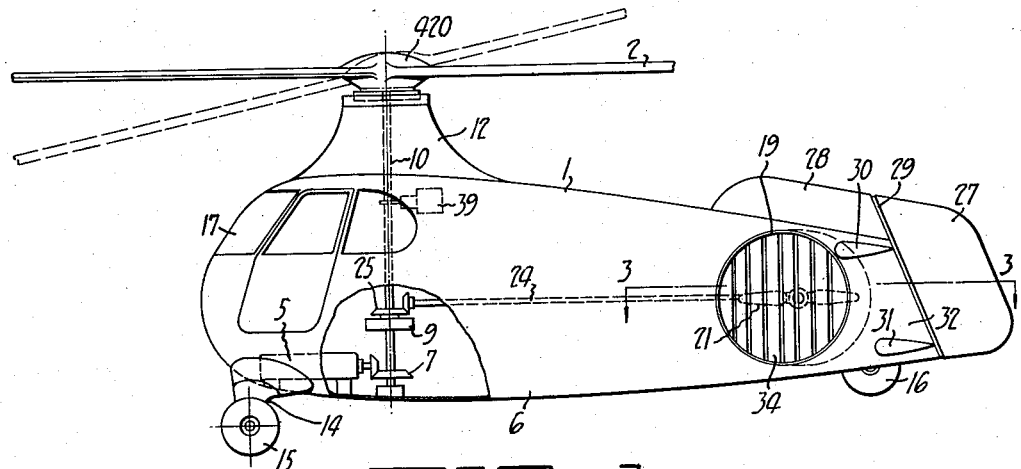
FIG_1_
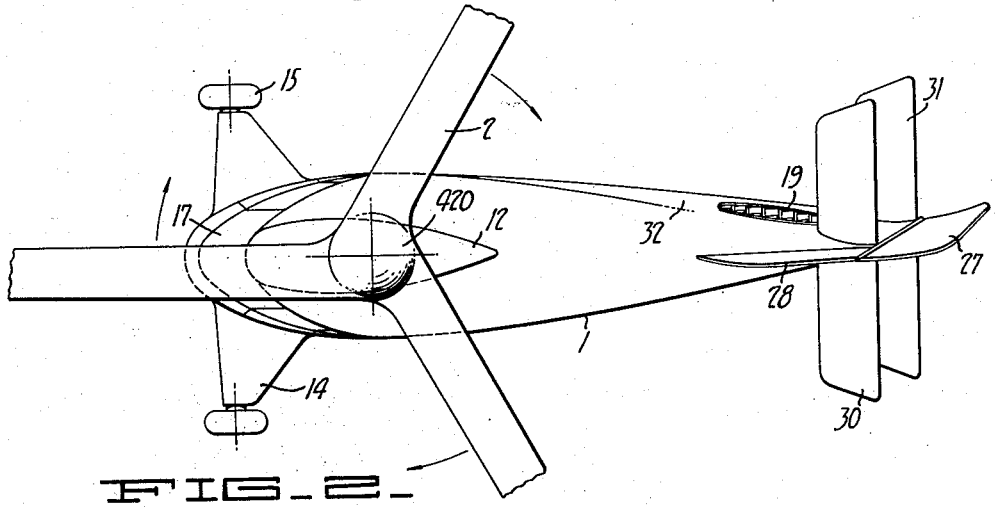
FIG_2_
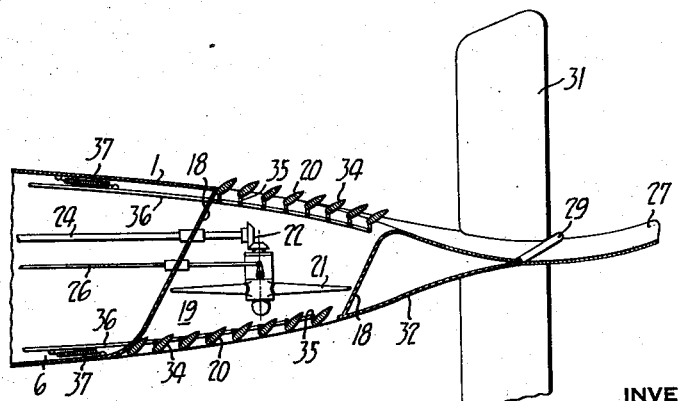
FIG_3_
INVENTOR
Harold T. Avery
BY
ATTORNEYS

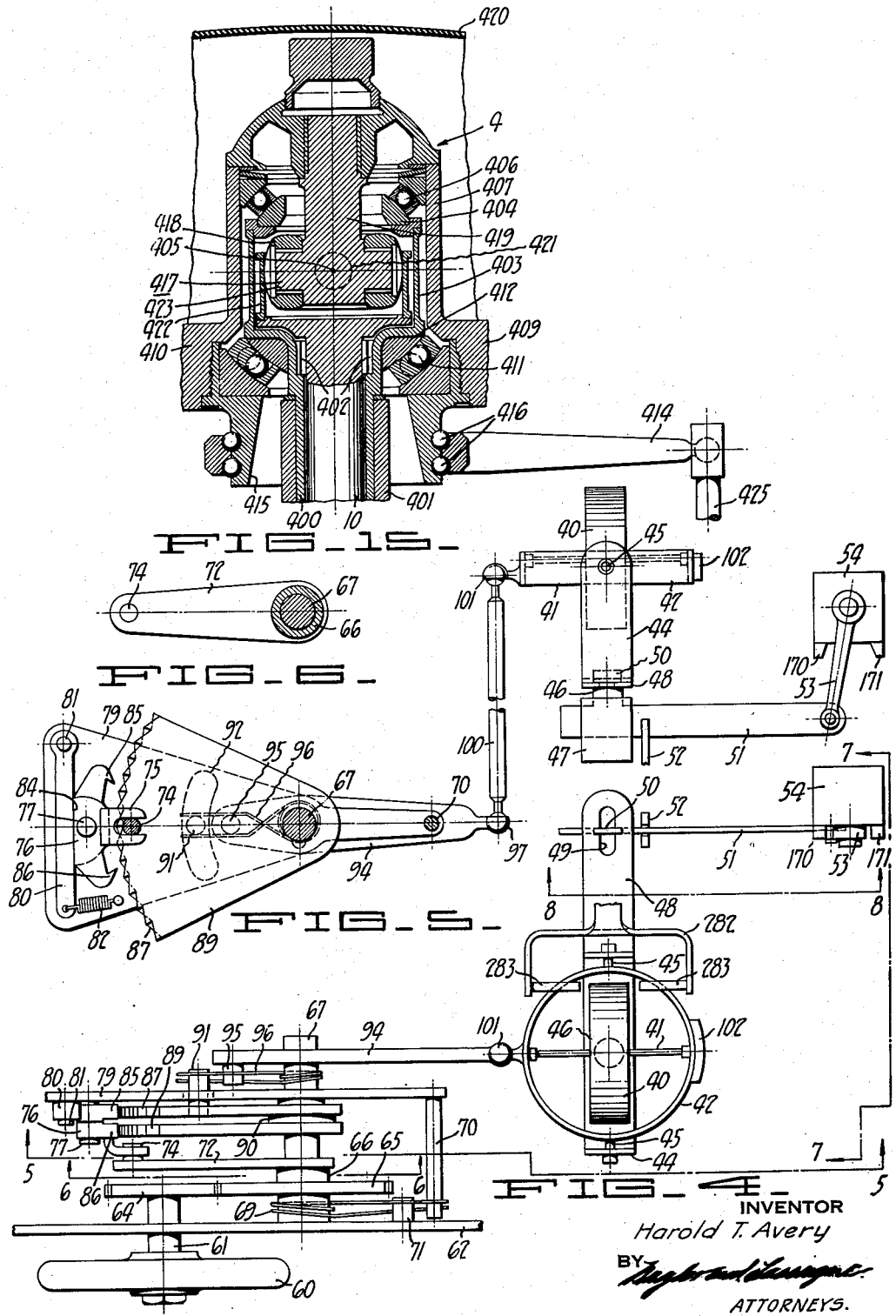

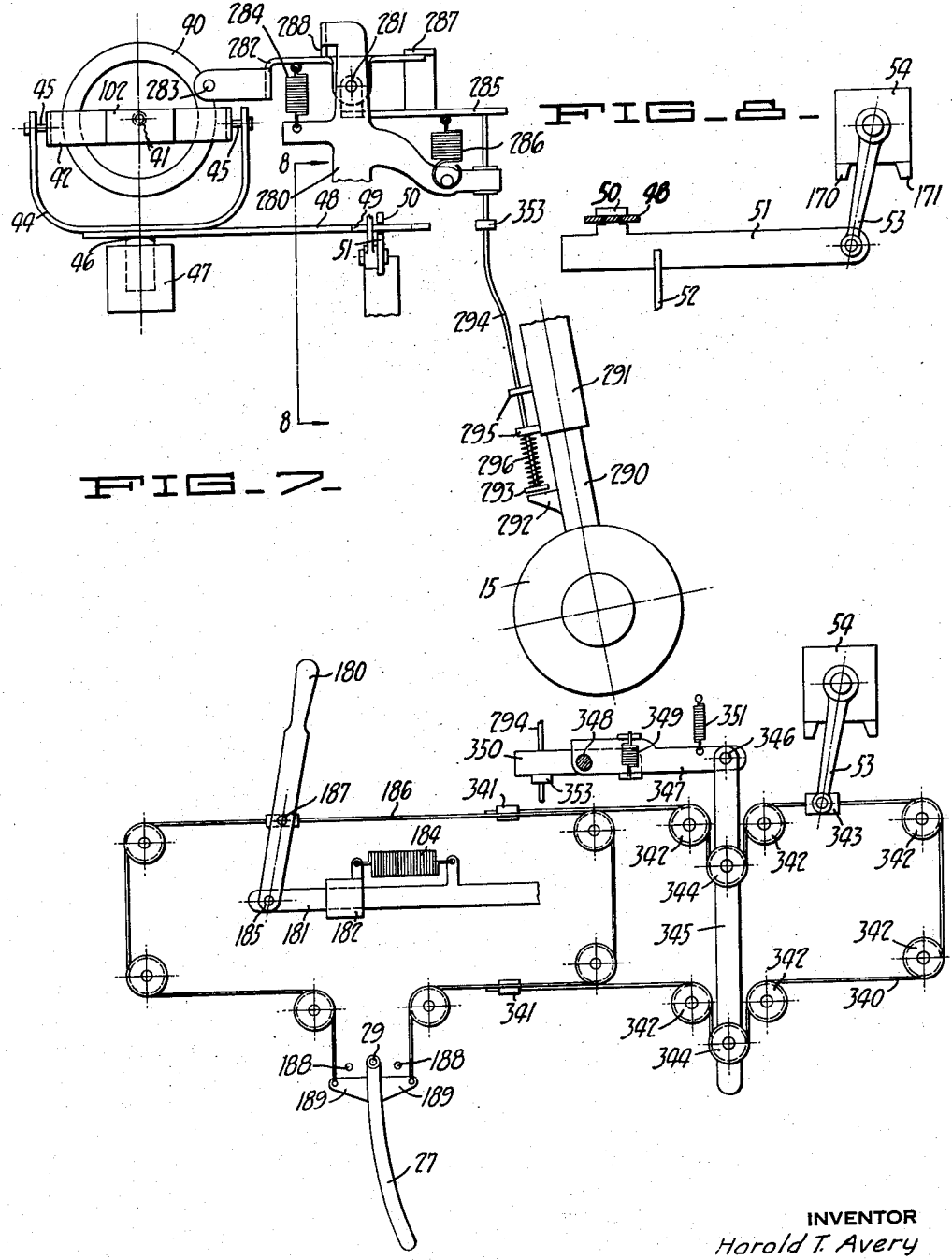

Feb. 20, 1945.   H. T. AVERY   2,369,652
HELICOPTER
Filed July 14, 1941   5 Sheets-Sheet 4
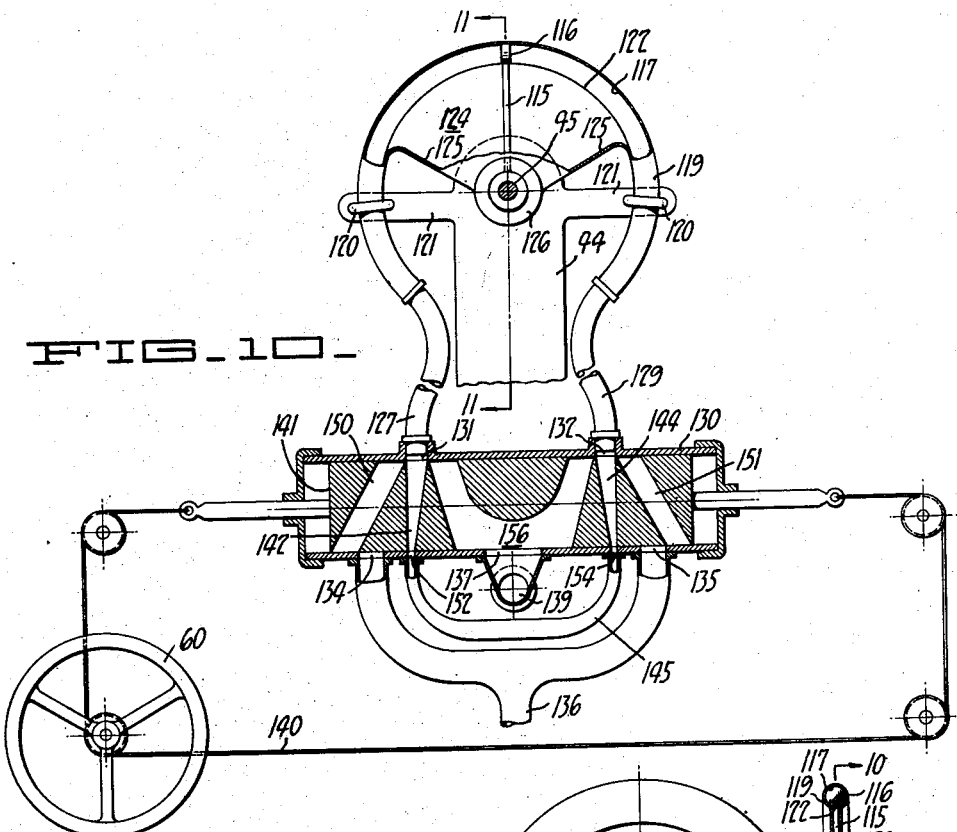
INVENTOR
Harold T. Avery
BY
ATTORNEYS.

Feb. 20, 1945.                H. T. AVERY                 2,369,652
                              HELICOPTER
              Filed July 14, 1941            5 Sheets-Sheet 5
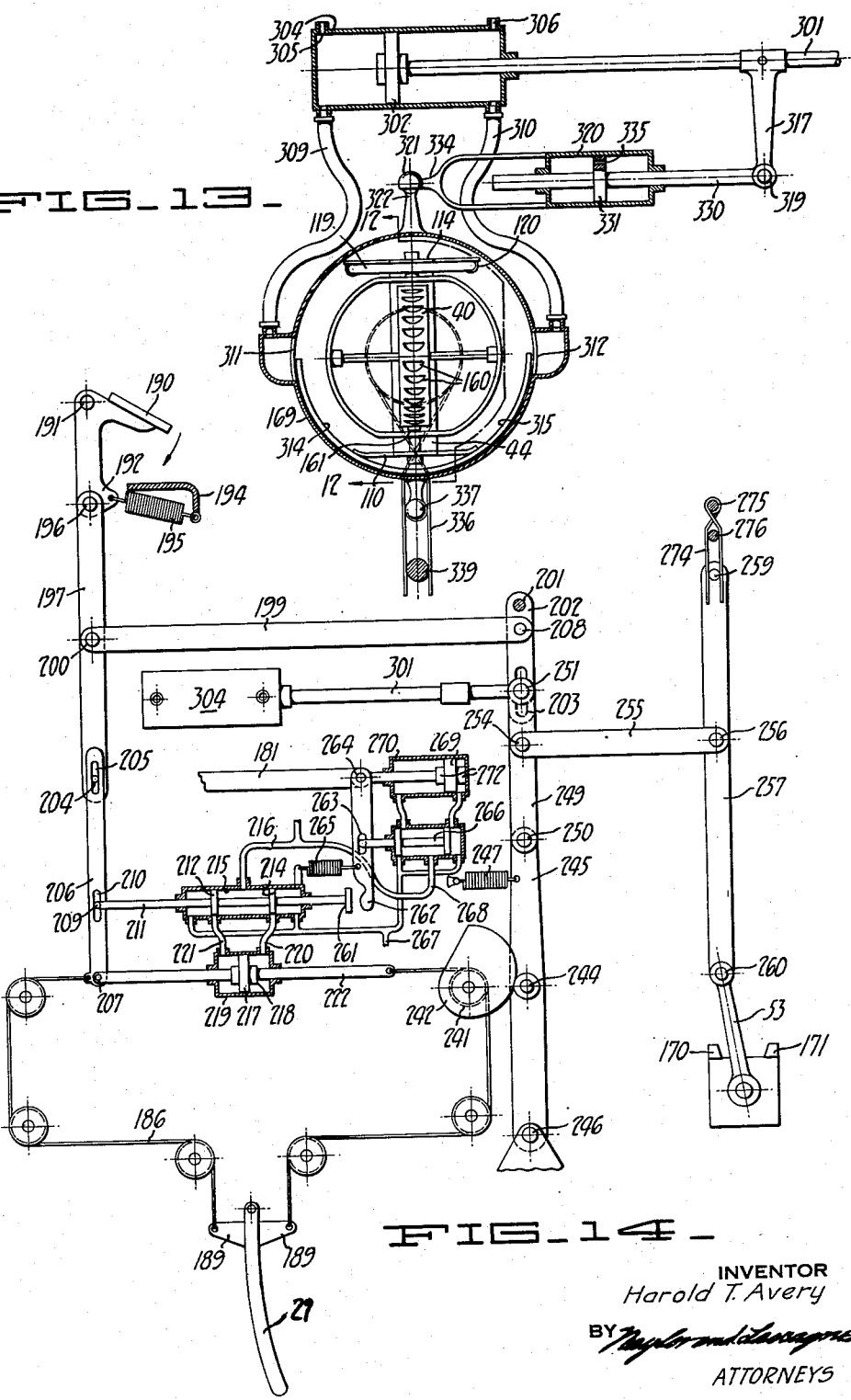
INVENTOR
Harold T. Avery
BY
ATTORNEYS Patented Feb. 20, 1945

2,369,652

UNITED STATES PATENT OFFICE 2,369,652

HELICOPTER

Harold T. Avery, Oakland, Calif.

Application July 14, 1941, Serial No. 402,283

34 Claims. (Cl. 244—17)

The present invention relates to aircraft of the helicopter species, and particularly to devices and controls therefor, the purpose of which is to improve the efficiency and stability of such craft. The more specific objects and advantages of the invention will be clearly understood in the light of a brief explanation of the problems which it is designed to solve.

The helicopter utilizing a single power driven rotor, both to sustain and to propel the craft, is unquestionably capable, at least within certain speed ranges, of becoming a more efficient aircraft than the airplane, the autogiro, or the multi-rotor helicopter. In both the airplane and the autogiro, power developed by the engine is first applied to a propeller which converts the mechanical power into aerodynamic force to create a thrust to move the craft forward through the air, by virtue of which movement airfoils in the form of fixed or freely rotating wings again convert this thrust into aerodynamic force to create the necessary lift to sustain the craft. In the pure helicopter, on the other hand, the power developed by the engine is directly applied to an adjustable rotor which may be disposed, selectively, at a proper angle to both sustain the craft and move it forward without the efficiency loss incidental to aerodynamic conversion of forward movement into lift. It is true that some helicopters have been equipped with propellers as well as sustaining rotors, but it is evident that two airscrews of this character, working at approximately a right angle to each other, develop a diagonal resultant force on the craft which can be more efficiently developed by a single airscrew set at a proper angle.

In aircraft the delivery of power to a rotor produces, by torque reaction, a tendency for the body of the craft to rotate in the direction opposite to that in which the rotor is being driven, which has been difficult to counteract or control, especially in craft intended to be capable of hovering or of slow translational or vertical flight, since under such conditions there is not enough movement of the air relative to the craft to set up an adequate corrective force aerodynamically. One solution which has most frequently been proposed for this difficulty is the use of one or more pairs of oppositely turning rotors. However, if two rotors are placed side by side, the structure required for mounting of the rotors becomes heavy and of a nature necessarily creating a large aerodynamic drag. With one rotor behind the other, the rear one operates at poor efficiency in forward flight, in the air disturbed by the forward rotor; while if one is placed coaxially above the other, similar aerodynamic inefficiencies result, in addition to which, if hinged rotor blades are employed (which is the most practical form of rotor construction), there is danger of physical interference between the blades of the two rotors unless they are separated by distances so great as to bring about poor mounting arrangements, particularly for the upper rotor, and to give such a high center of gravity as to impose difficult stability problems.

In the helicopter having only a single rotor, power driven in flight, it has been proposed to counterbalance the rotor driving torque by the use of anti-torque vanes operating in the downwash of the rotor and the slip stream of the craft. While such arrangements are quite practicable in normal forward flight of the craft, air flow conditions differ so greatly in hovering and in vertical ascent and descent as to make it almost impossible to provide simple, dependable control in this manner under all flight conditions that a helicopter is likely to encounter. Another alternative frequently proposed has been the provision of auxiliary airscrews, but these consume power; and when mounted as heretofore proposed create considerable aerodynamic drag in normal flight, in addition to which difficulty may be encountered in readjusting the thrust of such propellers rapidly enough to meet the torque changes due to changes of engine throttle setting and the like. Other alternatives proposed have included different arrangements for making the individual blades of the rotor self-propelling, but these all involve mechanical complications and aero-dynamic inefficiencies at least as great as those involved in the double aerodynamic conversion of the aeroplane and autogiro, as previously mentioned.

The single rotor helicopter offers the maximum of simplicity, compactness, inherent stability, and efficiency obtainable in combination with hovering and vertical flight performance. The principal difficulty encountered in the past has been in connection with providing anti-torque means which would dependably balance the rotor torque under all flight conditions, and would give high overall flight efficiency. The present invention contemplates providing such anti-torque means, the principal elements of which are as follows:

(1) An auxiliary airscrew together with means for bringing the airscrew automatically into operation to provide selective amounts of antitorque as required, and for automatically sealing off the airscrew within a stream-lined fuselage so that it will offer no drag to the craft when its use is not required;

(2) An anti-torque vane so related to the aerodynamic lines of the craft as to give minimum drag under cruising conditions and sufficient anti-torque under such conditions to make the use of the auxiliary air screw unnecessary while cruising; and (3) Means for automatically adjusting the engine throttle to so control the engine output as to maintain torque balance, which inherently includes means for preventing changes in engine throttle setting becoming effective more rapidly than the anti-torque means are readjusted to take care of the consequent change of torque, these means preferably comprising gyroscopic means for controlling the adjustments.

The principal object of the present invention, therefore, is the provision of a helicopter capable of highly efficient operation under normal flight conditions and dependably stable operation under all flight conditions.

A further object of the invention is to utilize selectively a plurality of torque counterbalancing means in accordance with changing flight conditions.

A further object of the invention is to prevent auxiliary torque counterbalancing means utilized only under unusual flight conditions from detracting from the efficiency of operation of the craft under normal flight conditions.

A further object of the invention is to provide automatic controls for the selective operation of the several torque counterbalancing means.

A further object of the invention is to coordinate the throttle and torque counterbalancing controls so as to automatically prevent a substantial, or any long continued departure from a desired heading of the craft, regardless of changes in engine power and other operating conditions.

A further object of the invention is to coordinate the steering and throttle controls so as to automatically prevent material changes in throttle setting as an incident to steering operations.

A further object of the invention is to provide improved and simplified power actuated controls and automatic followup mechanism for the purposes described.

A further object of the invention is to provide means effective to automatically centralize and cage the gyroscopic control means when the craft is on the ground, together with means which automatically release the gyroscope into free gyroscopic control as the craft leaves the ground.

A further object of the invention is to provide controls capable of manually adjusting engine throttle setting when the craft is on the ground together with means for automatically altering these controls on takeoff, so that in the air they can only adjust engine throttle setting through the medium of the torque balancing means.

Additional objects and advantages of the invention will be made apparent in the course of the following description of preferred embodiments thereof which is to be read with reference to the accompanying drawings, in which:

Figure 1 is a side view of an aircraft embodying my invention, partially broken away to show a portion of the interior construction;

Figure 2 is a top view of the craft illustrated in Figure 1;

Figure 3 is a sectional top view of the rear portion of the craft, taken as indicated by arrows 3—3 in Figure 1, and showing in open position the louvers which selectively house one of the anti-torque devices;

Figure 4 is a top plan view of the gyroscopic control for balancing torques, the linkage through which steering is effected by causing the gyroscopic control to precess as desired, and a portion of the mechanism for caging the gyroscope or alternatively providing limit stops for its precession about a horizontal axis;

Figure 5 is a view, taken as indicated by line 5—5 in Figure 4, showing the linkages connecting the steering means, the gyroscopic control, and the torque balancing means;

Figure 6 is a view taken along line 6—6 of Figure 4, of a portion of a connection through which the steering wheel effects precession of the gyroscopic control means;

Figure 7 is a view of the gyroscopic control and the torque control linkages, taken as indicated by arrows 7—7 in Figure 4, and also showing the mechanism for caging or alternatively providing limit stops for the gyroscope together with the means by which the landing wheel exercises control over this mechanism;

Figure 8 is a detailed view of a portion of the torque control linkages, taken as indicated by line 8—8 of Figures 4 and 7;

Figure 9 is a schematic view of the connections between the control lever and the anti-torque devices, together with the means for directly controlling the throttle setting by the same control lever when the craft is on the ground;

Figure 10 is a schematic view of an alternative embodiment, shown partially in section, for effecting steering through hydraulic means for causing precession of the gyroscope, the upper portion being taken as indicated by line 10—10 in Figure 11;

Figure 11 is a view of the gyroscopic apparatus, showing the hydraulic precession control, partially in section, taken in the direction of arrows 11—11 in Figure 10, and showing a preferred mode of driving the rotor;

Figure 12 is a vertical section taken on line 12—12 of Figure 13 and shows the mechanism of Figure 11 housed in a casing provided with means by which the gyroscope may exercise its control pneumatically, as an alternative to the mechanical means for exercising such control, which is also shown in this figure;

Figure 13 is a top view of the mechanism shown in Figure 12, showing the casing in section, and also showing structure not included in Figure 12 for smoothing out the steering action incidental to the balancing of torques, and for smoothly eliminating any change of heading incident to changes in the torque values;

Figure 14 is a schematic view of a hydraulically operated embodiment of the mechanism intended to cooperate with that shown in Figures 10 to 13, inclusive, for controlling the engine power and anti-torque setting, and producing automatic balance between the effect of the resulting rotor torque and that of the various anti-torque devices; and Figure 15 is a vertical section through the center of the rotor hub, showing the rotor tilting mechanism.

GENERAL CONSTRUCTION OF CRAFT

Referring now to the drawings, in Figures 1 and 2 there is illustrated an aircraft, generally designated as 1, which utilizes a single rotor 2 mounted for both sustentation and propulsion. The rotor 2 has been illustrated as being of the three-bladed type, and may be constructed in accordance with known practice, such, for example, as that disclosed in Larsen Patent Number 2,220,109 dated November 5, 1940, although for helicopter use the attainable angles of attack of the blades should preferably be more nearly of the order of those provided by the hinge arrangement disclosed in my Patent Number 1,993,701 dated March 5, 1935.

The rotor hub may be enclosed in a surrounding fairing 420 of rubber or other flexible material to protect the mechanism and reduce drag. Within the hub 4 are disposed means permitting tilting the axis of rotation of rotor 2 in any direction under the control of the operator, exercised through a tilt control arm 414. These means may be such as those shown in Figure 15.

As shown in Figure 15, the vertical rotor drive shaft 10 revolves within a journal 400 secured through an outer support housing 401 to the framework of the craft. Journal 400 is separated from shaft 10 by roller bearing 402, and is integral with an inner support housing 403, on which is fixed an upper support ring 404, the outer surface of which is a portion of a sphere, the center of which is at 405.

Bearings 406 ride on the ring 404 and directly carry outer support housing 407, which is thereby permitted to tilt about center 405. The rotor blades, not shown, attach to wing roots 409 and 410 integral with outer support housing 407, and the downward components of rotor weight are transmitted through bearings 406 to the craft 1. Upward components of lift are transmitted thereto by lower bearings 411 disposed within outer support housing 407 and engaging a lower support ring 412 fixed to inner housing 403, the outer surface of which ring is also a portion of a sphere having its center at 405.

Thus the entire rotor 2 is free to rock about center 405, the amount of tilt being controlled by the operator through a tilt control arm 414 operating against a flared skirt portion 415 of outer housing 407 through bearings 416.

During all such tilting, power may be supplied from shaft 10 to the rotor 2 through a universal joint 417 rockable about center point 405, and including the connecting ring 418, pivotally connected by means of pins 421 to the ring 422 fixed to shaft 10, and pivotally connected through pins 423 to the intermediate drive shaft 419 keyed into the upper portion of outer support housing 407.

The pilot is thus able to direct his craft in any desired line of flight with only one aerodynamic conversion by manipulating tilt control arm 414 which is connected through suitable linkage, including link 425 to a tilt control member in the pilot's cabin, all the lift and forward propulsion being exerted through the single three-bladed rotor 2 up to the limit of power available from the engine 5. The engine 5, which may preferably be of a liquid cooled "pancake" type, is mounted at the bottom of the fuselage 6 in craft 1, and forward of drive shaft 10, to keep the center of gravity low and properly located with respect to the center of lift. The engine torque is transmitted through helical gears 7, or equivalent means, connected through the clutch unit 9, which preferably includes both a manually controllable clutch and an over-running clutch, to the vertical drive shaft 10 leading into the rotor hub 4. Suitable gearing, not shown, may be provided to effect a reduction of speed between the motor 5 and rotor 2, and may be disposed adjacent to the rotor hub 4.

The rotor 2 is elevated above fuselage 6 for clearance in tilting and flapping movement, or for folding during road travel or shipment. The drive shaft 10 and all supporting members and controls leading to the hub 4 are enclosed within a streamlined housing 12 which blends into the fuselage 6 in such a way as to offer the least resistance in passing through the air. Streamlined housings 14 likewise enclose axles and supporting struts which may be of current autogiro design, attaching the widely separated front wheels 15 to the fuselage 6, while rear wheel 16 may optionally be arranged to be driven from the engine for propulsion of the craft on the ground, as is present known practice in connection with autogiro construction.

The forward end of the fuselage 6 encloses a wide vision compartment 17 for the flying personnel, instruments, and so forth. At the rear end of the fuselage 6, and sealed therefrom by walls 18, an anti-torque tunnel 19 extends diagonally through the ship. Tunnel 19 is normally closed tightly by adjustable louvers 20 which are designed to continue the smooth streamlines of the fuselage 6.

ANTI-TORQUE MECHANISMS

An auxiliary airscrew 21 is mounted within tunnel 19 for rotation about an axis of revolution extending generally transversely of the craft. This auxiliary air screw 21 is driven from engine 5 through gearing 22 by a horizontal auxiliary drive shaft 24 geared at 25 to the vertical drive shaft 10 above clutch unit 9. Thus the anti-torque airscrew 21 rotates in synchronism with the main rotor 2 whenever the latter revolves, regardless of the operation of the engine 5. The anti-torque airscrew or propeller 21 is preferably of the adjustable pitch variety and may be operated through a pitch control shaft 26 leading to the pilot's cabin. Under normal conditions it remains at zero pitch.

The anti-torque effect required in normal forward flight is obtained by using a rudder and fixed stabilizing surfaces, warped and skewed in a continuous curve, to produce a strong turning moment opposite in direction to the reaction of the craft to the rotor, whenever an air stream passes over the craft downwardly or rearwardly with substantial velocity. The vertical stabilizing surface 28 is angled relative to the longitudinal axis of the fuselage 6, and rudder 27 forms a substantial continuation of surface 28 when in neutral position.

Rudder 27 is pivoted about a forwardly sloping post 29 which is also angled downwardly toward the right, as viewed from the rear of the craft. Hence upper horizontal stabilizing surface 30 is displaced laterally from vertical alignment with lower horizontal stabilizing surface 31, each being symmetrical about the rudder post 29. The entire tail end 32 of fuselage 6 is shaped so that a smooth streamlined confluence is obtained from the forward portion of the fuselage to the tail surfaces. Under normal forward flight conditions the anti-torque effect of these surfaces is automatically kept in exact balance with the rotor torque by automatic readjustment of the engine throttle setting in a manner to be hereinafter described, and the general level of throttle setting is controlled by adjustment of the anti-torque surfaces. Increase in engine throttle setting will, in addition to increasing rotor torque, cause some increase in anti-torque effect, due to the increased velocity of the rotor slip-stream. The transmission of energy from the rotor to the anti-torque surfaces will not be direct and efficient enough however, for the anti-torque effect to increase at all proportionately to the increase in rotor torque. Therefore, increase in engine torque will cause a net change in turning effect in the direction in which the reaction from the rotor torque tends to turn the craft.

When the craft 1 is not operating under normal, forward flight conditions, as for instance, when ascending, descending, or hovering, or advancing very slowly, the turning moment due to the airstream impinging on the fixed vertical stabilizing surface 28 and rudder 27 may be insufficient to counterbalance the rotor torque. In such case the pitch of anti-torque propeller 21 is automatically adjusted so as to supply the required anti-torque effect and control the heading of the craft.

The louvers 20 are made up of a number of substantially vertical slats 34 of airfoil cross section, pivoted to rotate about parallel vertical axes. The slats 34 are arranged to overlap in closed position enough to present a smooth and reasonably tight covering for tunnel 19, conforming with the streamlines of fuselage 6. Integral with each slat 34 is a bell crank arm 35 by means of which it is connected to a control rod 36, there being one such rod for each side of the craft. Forward movement of the right hand rod 36, and rearward movement of the left rod, operates to close all slats, and the opposite movement of these rods to open them. When louvers 20 are open, the airfoil section of slats 34 offers a minimum of resistance to the anti-torque airstream through tunnel 19, the least resistance, of course, being obtained when the slats 34 are parallel to tunnel 19.

The louver control rods 36 and the propeller pitch control 26 are so interrelated in their action that the louvers 20 remain closed as long as propeller 21 is at zero pitch, but automatically open in synchronism with the increase of propeller pitch until they stand substantially parallel to tunnel 19. This action may be secured by mechanically joining control rods 36 to the control for pitch control shaft 26 by conventional linkages, not shown, or it may preferably be secured by the action of springs 37 acting between rods 36 and the fuselage 6 in such a manner as to normally hold all the slats yieldably in closed position with a force so proportioned that when propeller 21 is brought into action the pressures created by the propeller slip stream immediately rotate the slats on their respective pivots to align them with the airstream.

AUTOMATIC TORQUE BALANCING MECHANISM

First embodiment

My invention contemplates utilization of a directional unit (which may, for instance, be a compass of the magnetic or of the earth inductor type, or may be a gyroscope as specifically disclosed herein) for detecting any change in craft heading due to lack of balance between the torque and the anti-torque effects, and for controlling the automatic balancing of these torques. One form of such gyroscope and torque balancing control mechanism is illustrated in Figures 4 to 8, inclusive. In this form the gyroscope controls the torque balancing solely by automatic adjustment of the engine throttle. The pilot may increase or decrease the general level of engine power by manual readjustment of the antitorque means through the controls illustrated in Figure 9.

Gyroscopic control of engine throttle

As illustrated in Figures 4, 5, and 7, a gyroscopic rotor 40 is supported for high speed rotation on shaft 41. Shaft 41 is in turn supported in the gimbal ring 42, which is pivotally mounted in yoke 44 by means of pins 45 at right angles to shaft 41. The pivots 45 may be coplanar with shaft 41 and special means provided to tend to cancel displacements of frame 42 about pivots 45, such means, for instance, comprising a split air jet arrangement such as utilized on the commercially available Sperry directional gyro; or the pivots 45 may be spaced vertically below shaft 41, as shown, so as to provide a sufficient degree of static instability to give the gyroscope, when in operation, the precessing and balancing characteristics hereinafter described. The yoke 44 is in turn rotatably supported with respect to the craft 1 upon a normally vertical shaft 46 journaled in a gyroscope support bracket 47 integral with the fuselage of the craft.

The gyroscopic rotor 40 is driven throughout operation of the craft by conventional means omitted from Figures 4 and 5 for clarity, but shown in Figures 11 to 14. This will be described hereinafter in connection with the embodiment illustrated in Figures 11 to 14.

A horizontal arm 48 is formed integrally with the yoke 44, and provided with a slot 49 extending lengthwise of the arm adjacent the outer end thereof, in which a lug 50 projecting from a control link 51 is slidably received. Control link 51 is reciprocably mounted normal to arm 48 in a fixed fork 52 and is connected pivotally to the craft's throttle control lever 53; the throttle 54 being, of course, mounted in a fixed position in the fuselage. Whenever a change of heading of the craft occurs, due to the lack of balance between the rotor driving torque and the anti-torque means, or for any other cause, the gyroscopic rotor 40 tends to continue to rotate about the same axis and to remain in position while the craft rotates thereunder with respect to pivot 46. The direction of such rotation will of course depend upon the relative magnitudes of the driving torque and the anti-torque. Such relative movements will cause rotation of horizontal arm 48 with respect to the craft about its pivot 46 which, in turn, will cause the control link 51 to be traversed in its guide fork 52, thereby resetting the engine throttle in the direction and to the extent necessary to bring the torques into balance and prevent further displacement of the craft.

For example, if the anti-torque developed is insufficient to balance the rotor torque, assuming clockwise rotation of the rotor 2 as viewed from above, the fuselage will begin to rotate counter-clockwise, causing clockwise displacement of arm 48 relative to the craft, thus moving link 51 toward the right in Figures 4 and 5 and causing counter-clockwise rocking of throttle lever 53, Figure 5, to reduce the engine power into balance with the anti-torque effect. If by the time the counter-clockwise rotation of the craft has been checked the throttle should be set below the proper point for balance, clockwise rotation of the craft will start and the process will be reversed. In any case angular displacement of the craft cannot proceed far in either direction, for only a limited amount of such displacement will result in completely closing or opening the engine throttle, and the tendency will be for throttle lever 53 to be continually rocked back and forth through a small angle across the position at which torques would be balanced. Mechanism having this type of operation, called "hunting," is normally free from static friction and very responsive. It is therefore frequently employed in gyrocompasses.

Any turning of the craft due to unbalance of torques will, due to the fact that the gyro axle 41 tends to maintain a fixed direction, cause the throttle linkage to exert a torque on arm 48 of the gyro assembly tending to turn the gyroscope with the craft, which torque causes the gyroscope to precess on its gimbal pivots 45, since the application of any torque to a universally mounted gyroscope tends to cause the spin axis to move into parallelism with the axis of the applied torque with the spin in the direction of the torque. For instance, assume that one-half pound pressure on link 51 is necessary to move throttle lever 53, and that link 51 is located two feet from the vertical axis of the gyroscope. Then assuming, as above, that the craft starts to turn toward the left. This causes link 51 to exert a leftward pressure on arm 48. This tends to displace the spin axis 41 of the gyro wheel 40 in a counterclockwise direction (Figure 4), which, if the wheel is assumed to be spinning in a clockwise direction, as viewed in Figure 7, will in accordance with the laws of gyrodynamics cause the gyroscope to rock in a clockwise direction on pivots 45, as viewed in Figure 5. The rate of such rocking will be directly proportional to the torque applied and inversely proportional to the mass of the gyro wheel times its rate of spin times the square of its radius of gyration. If the applied torque is one foot pound, as above assumed, the gyro-wheel weighing four pounds, having a twelve inch radius of gyration, and spinning at 1000 R. P. M., the rate of precession would be in the neighborhood of two degrees per second. As long as the gyroscope is free to precess about its pivots 45 at this rate, it will continue to exert one foot pound of torque about axle 46, which torque is assumed to be sufficient to move throttle lever 53 at any rate determined by the rate of turning of the craft. Obviously a time interval of a second or less is all that would ordinarily be required to move throttle lever 53 sufficiently to bring the torques into balance, and due to the lag in response, out of balance on the other side, thus reversing the tendency of the craft to turn. Therefore, before the gyroscope has precessed more than two degrees in one direction about pivots 45, its direction of precession is reversed so that the movements about pivots 45 tend to be very slight and to balance out.

Assume, however, that in some manner the torques have settled down into so perfect a balance that the "hunting" tendency of the controls has ceased, and that the craft develops enough tendency to turn to the left to cause link 51 to press leftward on arm 48 but does not turn enough to develop quite enough pressure to rock throttle lever 53. Gimbal ring 42 would then continue to precess clockwise (Figure 5) about pivots 45 at a rate somewhat less than two degrees per second. Due to the center of gravity of the gyroassembly being above pivots 45, gravity applies a clockwise torque to the gyroscope about said pivots as viewed in Figure 5, which will cause the gyroscope to precess clockwise about its vertical axle 46, as viewed in Figure 4, that is to advance against the pressure that created the condition, thereby moving the throttle lever to terminate the pressure.

If in spite of these tendencies for all tilting about pivots 45 to be self-limiting and balancing the gyroscope gradually assumes a tilt about pivots 45, for instance, to the right (clockwise, as viewed in Figure 5); this will cause a rightward turning of the gyroscope at a rate proportional to the gravitational couple, or approximately proportional to the tilt. Therefore, as the craft turns slightly back and forth with the "hunting" movement previously described, the rightward turning gyro will help to cut short each leftward movement of the craft and to prolong each rightward movement, thus resulting in a net turning of the craft to the right in synchronism with the rightward turning of the gyroscope. Since, however, the torque exerted on the gyroscope by link 51 during leftward turning of the crank tends to cause rightward precession about pivot 45 and vice versa, the shortening of leftward movements and prolonging of rightward movements will produce a net tendency for the gyroscope to precess leftward about pivots 45, or to right itself, and the greater the tilt of the gimbal ring, the greater this tendency. Also, if the pilot, noting the tendency of the craft to turn to the right, applies a corrective steering movement, it will, in accordance with the description of steering hereinafter, exert a pressure on the gimbal ring such as to tend to cause a righting thereof.

*Automatic caging and releasing of gyroscope*

A gyroscope can exert a torque due to its gyroscopic action only so long as it is free to precess. If its precessions in any direction be prevented it ceases to be effective to exert a torque in the direction that would tend to produce the particular precession that has been prevented. It is, however, desirable to so constrain the gyroscope that it will start operation substantially free from lateral tilt when the craft starts flight and to prevent excessive tilt thereof during flight. Since the gyroscope is not required to exert any control while the craft is on the ground, it is permissible to have means then applied for either positively or yieldably preventing rocking of gimbal ring 42 about its pivots 45 and for holding the ring in its central, level position. Preferably, however, such means should automatically withdraw as the craft leaves the ground so as to insure that gyroscopic control will always be operative when the craft is in the air. Such means is illustrated in Figures 4 and 7 in which bracket 280 integral with the frame of the craft carries a stud 281 on which is pivotally mounted a forked lever 282 integrally mounted in which are two studs 283 overlying gimbal ring 42. Lever 282 is pulled downwardly by spring 284 with sufficient strength to "cage" the gyroscope, that is to effectively prevent rocking about pivots 45. Also pivotally mounted on stud 281, however, is another lever 285 pulled downward by a stronger spring 286, and having an ear 287 overlying the tail of lever 282, so that when lever 285 is free to respond to spring 286, it rocks lever 282 upward about stud 281, against the tension of spring 284 until the lever engages a fixed ear 288 on bracket 280, thereby raising studs 283 away from gimbal ring 42 but leaving them positively blocked in such a position as to form suitable limit stops for the lateral tilting of ring 42 during flight.

In order to automatically cage the gyroscope when the craft is on the ground, and automatically release it into free operation as the craft leaves the ground, strut 290, on which landing wheel 15 is mounted and which, under the weight of the craft telescopes into sleeve 291 of the craft framework when the craft is on the ground, carries a bracket 292 designed to engage plunger 293 integral with the lower end of a flexible rod 294 guided in brackets 295 and pressed downward by spring 296. The upper end of rod 294 underlies lever 285 with the result that when the craft lands the upward movement of strut 290 relative to the framework of the craft, rocks lever 285 upward permitting lever 282 to respond to spring 284 and "cage" the gyroscope, whereas in takeoff the relative lowering of strut 290 releases the gyroscope before the wheels leave the ground.

With the self-righting tendencies of the gyroscopic arrangement above described it is not probable that the gyroscope will ever tilt far enough to engage pins 283 as limit stops in flight except when throttle 53 engages one of its end stops 170, 171. When this occurs the torque that link 51 may apply to the gyroscope, instead of being limited to the small torque value determined by frictions, may step up to a very high value, and the rate of precessional tilting of the gyroscope step up correspondingly and remain in one direction until the conditions which brought throttle lever 53 against its stop are altered. Under these conditions the gyroscope may tilt so much as to engage one of the pins 283 as a stop very shortly after lever 53 engaged its end stop. During the rapid tilting the pressure of lever 53 against its end stop will be large but as soon as pin 283 stops further precession of the gyroscope this pressure practically disappears because the gyroscope, being no longer free to precess in the proper direction can no longer exert gyroscopic torque in the direction in which it was exerting it. However, the gyroscope is still free to precess in the opposite direction and to exert torque in the direction opposite to that just exerted, and therefore takes up control instantly as soon as lever 53 moves away from its end stop. The conditions which would bring throttle lever 53 against its end stops are not such as to seriously endanger the operator's control of the craft. In one direction it can only occur with the engine completely throttled down accompanied by application of enough reverse rudder to turn the craft leftward. In the other direction it can only occur if the operator applies more antitorque than the engine at full throttle can counterbalance. The pilot knows that if under full throttle condition the craft starts to turn unduly to the right, he must reduce his anti-torque setting whereupon the gyroscope will automatically be instantly ready to properly counterbalance the torques.

Mechanical precessing mechanism for steering

In the embodiment thus far described, it is necessary for the craft to undergo a slight change of direction before the torque balancing means becomes effective. The change of heading required to make such balancing means effective need only be of an order comparable to the displacements for which the automobile driver is continually making steering correction, and the departure from true course can easily be compensated for by the operator. Beyond such changes the control operates to prevent the craft from changing its heading as long as nothing operates to change the orientation of the gyroscope except the small amount of approximately balanced precessing incident to maintaining the balance of torques, as above described. Steering, therefore, cannot be effected by a rudder in the manner customary in aircraft.

Assuming, for example, the pilot wishes to turn his craft to the right onto a new course, if he attempts to use his rudder control to do so, the first departure of the craft to the right of its original course would cause the gyroscope to open the throttle so as to produce enough increase in rotor torque to hold the craft substantially on its original heading in spite of whatever rudder movement may have taken place. Therefore, to bring the craft onto a new heading it is necessary to cause the gyroscope to precess through the angle through which it is desired to turn the craft. Such precessing of the gyroscope will simultaneously change the craft heading without the necessity for any rudder operation, for at all times during the turn the gyroscope will act to readjust the throttle setting so as to tend to keep the craft on a heading corresponding to the instantaneous orientation of the gyroscope.

Assuming, as previously, that the gyroscope is spinning clockwise, as viewed in Figure 7, rightward precessing of the gyroscope will be caused by applying a pressure to gimbal ring 42 tending to rock it clockwise on pivots 45, as viewed in Figure 5. The rate of rightward precessing of the gyroscope will be proportional to the pressure applied to gimbal ring 42, and some movement of the gimbal ring in the direction of the applied pressure will ordinarily take place also, because, as previously described, the ring will precess in response to the torques applied to it by the engine throttle linkage. During a right turn, for instance, the hunting movement of the throttle linkage will ordinarily be much more rapid than the turning movement, causing the throttle link 51 to set up resisting torques which will cause the gimbal ring to oscillate equally rapidly on pivots 45, but because of the rightward precessing of the gyroscope these resisting torques will be predominantly toward the left thereby causing the rightward tilting movements of the gimbal ring to predominate. At times other than during intentional changes of heading it is preferable to leave the gyroscopic assembly free to adjust itself about the axis of supports 45 and 46 in response to the gyroscopic forces as set up by force of gravity and movements of the craft, and it is therefore arranged that the constraining effect of the steering wheel on the movements of the gyroscopic control is suspended when the steering wheel is in its normal neutral position.

In Figures 4 to 6, I have shown the details of the linkage between the steering wheel and the gyroscopic unit for applying the pressures to gimbal ring 42 to effect heading changes. A steering wheel 60 is mounted on a shaft 61 extending through a frame member 62 and carrying fixedly a gear 64. A gear 65, meshing with gear 64, is journaled, by means of a hub 66 formed integrally therewith, on a stub shaft 67 fixed in the frame member 62. A lever 72 is formed integrally with hub 66 and gear 65, and has a stud 74 extending from the end thereof into engagement with a slotted fork 75 projecting from a double acting pawl 76.

The pawl 76 is rockably mounted by pin 77 on a pawl plate 79 which is loosely journaled at one end about shaft 67 and is normally centered by conventional centering means such as a spring 69 tending to align a stud 70 in plate 79 with a stud 71 fixed in the frame member 62. The pawl 76 is centered normally relative to pawl plate 79 by a centering bar 80 pivoted on the plate at 81 and urged by a spring 82 against a camming surface 84 formed on the pawl 76. This centering of pawl 76 combined with the centering of plate 79 in the manner just described, provides an action which always tends to center stud 74 and thereby center steering wheel 60 at its normal neutral position.

When wheel 60 is turned, pin 74 rocks the double pawl 76 relative to pawl plate 79, so that one or the other of the axially offset pawl teeth 85 or 86 will engage the corresponding one of the oppositely effective offset arcuate ratchet sectors 87 and 89 of a double ratchet member 90 journaled on shaft 67, and cause the ratchet member to rock thereon. This rocking motion is transmitted by a stud 91 fixed in the ratchet member 90 and projecting through an arcuate slot 92 in pawl plate 79, to the gyroscopic unit through a resilient linkage which linkage includes a lever 94 which is rockably mounted on shaft 67, and has projecting therefrom a stud 95 which is urged into radial alignment with the ratchet sector stud 91 by a spring 96.

At the end opposite stud 95 lever 94 is terminated in a ball and socket joint 97, which receives a vertically disposed column 100, long in relation to the expected arc through which joint 97 will travel. At the opposite end of column 100, a similar ball and socket joint 101 is provided for connection to the gimbal ring 42.

It will be obvious that regardless of the relative positions of the ratchet sector 90 and the pawl 76 at any given instant, and therefore regardless of the amount of lateral tilt of gimbal ring 42 at the time, a slight displacement of the steering wheel 60 from its neutral position will immediately apply a force to the gyroscopic control unit, tending to tilt the gimbal ring 42 in a direction corresponding to the direction in which the steering wheel has been turned from neutral.

The entire steering linkage should be constructed so as to be in static and dynamic balance so as to exert no force tending to unbalance or restrain the movement of gimbal ring 42 except when steering pressure is applied through the medium of spring 96. If necessary, weight 102 may be fixed to the opposite side of gimbal ring 42 in order to secure proper balance of the entire system. When the steering wheel 60 is turned in either direction out of its neutral position, however, it will cause the connections including spring 96 to apply a tilting pressure to gimbal ring 42 roughly proportional to the displacement of the wheel from neutral, thereby causing the gyroscope to precess in the direction corresponding to the steering response expected from the wheel displacement, at a rate proportional to the pressure applied, thereby altering the throttle setting without affecting the anti-torque, and thus causing the craft to turn in the same direction and at the same rate as the precessing of the gyroscope takes place.

Therefore, regardless of whether the craft is flying on a straight course or turning, the engine power is thus entirely controlled by the gyroscope at the requisite value for counterbalancing the anti-torque effect and keeping the craft always headed in the direction desired. A sustained increase in engine power can therefore only be obtained by increasing the anti-torque effect, whereupon the engine output will automatically be increased to meet it.

*Anti-torque control*

Figure 9 represents diagrammatically means for controlling the anti-torque effect to obtain such sustained power changes. The anti-torque control lever 180, which in operation would be used substantially like the throttle lever on an ordinary craft, is rockably mounted by means of stud 185 on link 181, which is slidably mounted in a fixed bearing 182, and normally held at the left extremity of its travel by spring 184. A connecting cord 186 is fixed to the lever 180 by a pivotal link 187, and has its ends connected to lever arms 189 fixed to rudder 27.

Thus counter-clockwise movement of control lever 180 about pivot 185 will cause counter-clockwise displacement of rudder 27, thereby increasing the anti-torque effect, and the gyro unit will immediately increase engine power to balance it.

Rudder 27 is provided with stops 188 to limit its angular displacement to an amount deemed reasonably efficient and properly selective in providing anti-torque effects somewhat proportioned to rudder displacement. When rudder 27 reaches its position of maximum displacement, further travel of cord 186 is blocked, whereupon further pressure, counter-clockwise against control lever 180, will cause the lever to rock on its pivotal link 187, overcoming spring 184 and traversing link 181 to the right, which movement serves, through conventional connecting linkage not shown, to actuate pitch control shaft 26 (Figure 3) for increasing the pitch of anti-torque propeller 21 as previously described, and also optionally to also operate links 36 for opening louvers 20 for passage of an anti-torque air stream. Thus the torques may be balanced throughout a range of power and a variety of flight conditions far beyond that for which the anti-torque surfaces alone would be adequate.

*Throttle control on the ground*

Since control lever 180 is only effective to thus control engine power during flight, with the gyro unit exercising its automatic control over throttle setting, it is desirable to have lever 180 directly connected to throttle lever 53 while the craft is on the ground, and automatically divorced from direct control of said throttle lever when the craft takes off. Mechanism for this purpose is also diagrammatically shown in Figure 9, including cord 340, the two ends of which are firmly attached to cord 186 at suitable points by means of clamps 341. Cord 340 is guided over fixed pulleys 342 and attached at a suitable point to throttle lever 53 by means of pivot block 343. Cord 340 is also guided over two pulleys 344 mounted on movable link 345, pivotally attached at 346 to lever 347 mounted on fixed stud 348 and connected by means of spring 349 to lever 350 also pivoted on stud 348, the spring ears on the levers being so arranged that levers 347 and 350 ordinarily act as a single lever pivoted on stud 348, but lever 350 is capable of rocking clockwise with respect to lever 347 upon application of a force great enough to overcome spring 349. Except when otherwise constrained the combined lever 347, 350 is rocked counter-clockwise on pivot 348 by means of the light spring 351, thus raising pulleys 344 in a manner adapted to introduce so much slack into cord 340 that the movements of cord 186 will not cause cord 340 to affect the position of throttle lever 53, and this condition maintains during flight. When the craft lands, however, the weight of the craft on the landing gear causes upward movement of rod 294 (Figures 7 and 9) relative to the craft, as previously described, which causes block 353 integral with said rod to move upward and engage lever 350, as indicated in Figure 9, rocking it clockwise on stud 348 and lowering link 345 into such a position that pulleys 344 bring cord 340 taut so that it transmits to throttle lever 53 all movements of control lever 180 and cord 186. Spring 349 is strong enough relative to spring 351 to readily overcome said latter spring and hold cord 340 taut with sufficient tension so that the effort required to move throttle lever 53 will not cause any yielding of pulleys 344. However, extra upward movements of rod 294 incident to the impact of the craft in landing will cause spring 349 to yield without exerting enough pressure on link 345 to overstress cord 340. Thus control lever 180 will at all times control the general level of engine power, through the direct action of cord 340, when the craft is on the ground, and through the action of the gyro unit in balancing torques when the craft is in the air, and the interchange between these two methods of control will always take place automatically as the craft takes off and lands.

It will be observed that each change of power level during flight will be accompanied by a small change in craft heading. These changes may be readily compensated for by the pilot, or an automatic steering device might be utilized. One such is shown in Figure 4 of my United States Patent Number 1,993,701 entitled "Aircraft," and other known steering devices might also be used.

Automatic Torque Balancing Mechanism

Second embodiment

A second alternative embodiment, and one which in many ways constitutes a preferred embodiment, is illustrated in Figures 10 to 14, inclusive. This includes an alternative means for applying pressure to the gimbal ring 42 to effect steering, wherein hydraulic connections are utilized. As in the previous embodiment, gimbal ring 42 is supported at two diametrically opposite points, preferably lying on a line perpendicular to axis 41, by pivots 45 journaled in supporting fork 44, which in this instance is integral with sleeve 164, which may be mounted for free turning movement about its vertical axis in a journal 165 formed integrally with a portion 166 of the aircraft framework, as shown in Figure 12, and may have secured thereto, by suitable means such as a lock nut 167, the throttle control linkage arm 48. This arm 48 may alternatively be utilized to mechanically position the throttle, like arm 48 of the first embodiment, but preferably arm 48 is not utilized in this embodiment and other means hereinafter described are utilized instead to position the throttle without exerting appreciable torque on the gyro assembly.

Hydraulic precessing mechanism for steering

As mentioned above, there is disclosed in connection with this second embodiment an hydraulic means for applying pressure to the gyroscope for causing it to precess at any desired rate to effect steering. This means accomplishes the same function as the mechanical means of the first embodiment as shown in Figures 4 and 5, but the hydraulic form is better adapted for use with the construction shown for the second embodiment, and has certain operational advantages over the mechanical form. As shown in Figure 11, a sleeve 112, integral with one of the pivot pins 45, carries an arm 115 extending radially outward therefrom and terminating in a vane 116 (Figures 10 and 11). This vane 116 is designed to oscillate within a toroidal chamber 117 defined by a tubular member 119 supported concentrically with pivot pin 45 by clamps 120 fixed to supporting arms 121 extending laterally from fork arm 44.

The reciprocal movement of vane 116 within chamber 117 is communicated to pivot pin 45 and gimbal ring 42, or vice versa, by the arm 115, which swings back and forth through a sector limited by an arcuate slot 122 out through the inner periphery of the tubular member 119. Flat sector-shaped side plates 124 join the tubular member 119 along the edges of slot 122, are united along their radial edges 125, and are formed into a cylindrical housing portion 126 concentric with pivot pin 45. The housing 126 may be sealed about pivot pin 45 by any conventional means, such as gaskets, not shown, which will permit rotation of the trunnion relative to the housing without leakage between the chamber space and the outside air. Toroidal chamber 117, of course, communicates freely with the sector-shaped chamber defined by side plates 124 and the cylindrical housing 126, and fluid may leak past vane 116 and arm 115 at a limited rate.

To cause the gyroscope to precess for steering purposes, pressure may be exerted on vane 116 by introducing hydraulic pressure to the tubular member 119 through flexible hoses 127 and 129 connected to opposite ends thereof and joined to an elongated valve housing 130 through ports 131 and 132 respectively. Pressure is led to valve housing 130 through matched intake ports 134 and 135 from a branched supply pipe 136, and exhausted to the pressure supply system through outlet port 137 and return pipe 139.

The steering wheel 60 is connected through suitable means such as a continuous cord 140 to both ends of a sliding valve member 141 disposed for reciprocation within valve housing 130. In Figure 10 the valve slide member 141 is shown in neutral position, to which it may be automatically returned by suitable centralizing means (not shown), whenever the steering wheel 60 is released.

In the neutral position illustrated, transverse passages 142 and 144 through valve member 141 afford a continuous closed passage through tube 119 and an outside return loop 145. Here the only resistance to movement of vane 116 is friction and the inertia of the enclosed pressure medium, so the gyroscope is free to adjust itself to changes in craft position. In some cases the device may be simplified by omitting transverse passages 142 and 144 and return loop 145, and allowing sufficient leakage between vane 116 and chamber 117 to accomplish the same purpose, particularly in view of the fact that some resistance may be desirable to damp oscillations of the gimbal ring under certain conditions, and considerable leakage past arm 115 and vane 116 is desirable in any case for reasons mentioned hereinafter.

If steering wheel 60 is turned to the right from the position shown in Figure 10, the by-pass loop 145 immediately begins to cut off and hydraulic pressure is introduced from pressure supply pipe 136 to the flexible hose 127 leading to the left end of the vane chamber 117. Supply pipe 136 communicates with chamber 117 through a port 134 opening into the left passage 150 of a pair of symmetrically disposed oppositely inclined valve passages 150 and 151. The passages 150 and 151 are of the same terminal width throughout as are the pressure inlet ports 134 and 135 and the ports 131 and 132 to which hoses 127 and 129 are attached. This dimension is exactly one-half the travel of valve member 141, and equals the end clearance between valve slide 141 and housing 130 in neutral. In neutral, the inner edges of passages 150 and 151 respectively are in alignment with the outer edges of ports 131 and 134, and 132 and 135, respectively.

It will thus be seen that when wheel 60 has traversed valve slide 141 slightly to the right of neutral, by-pass 145 is entirely cut off, and pressure is applied from source 136 through pipe 127 to chamber 117, exerting clockwise pressure on valve 116 and arm 115, and tending to rotate the gimbal ring 42 secured thereto in a clockwise direction. Obviously the amount of flow will increase as the width of the portion of passage 150 communicating with ports 131 and 134 increases during movement of the valve slide 141, while the quantity of hydraulic pressure medium passing through by-pass 145 will quickly decrease to zero. Port 132 will be opened to connect with return conduit 156 simultaneously with the opening of ports 131 and 134 to passage 150 and in like amounts. As previously mentioned there is a certain cross-sectional area provided for leakage of the hydraulic fluid past arm 115 and vane 116. So long as this leakage area is large as compared with the constriction to hydraulic flow at the ports of cylinder 130 only a small amount of pressure will be exerted on the arm and vane, but as the slide 141 is moved, by further turning of wheel 60, to open the ports wider, the hydraulic flow increases and exerts increased pressure on the arm and vane. Therefore, whenever the wheel 60 is turned either direction from neutral, a pressure will be exerted in a corresponding direction on vane 116 and arm 115, the amount of pressure increasing with the distance wheel 60 is turned from neutral.

As will presently appear, in this second embodiment, unlike the first embodiment, the gyroscope controls the throttle setting without exerting any appreciable torque about its vertical mounting axis in so doing. Therefore the torque balancing and steering does not involve any appreciable displacement of gimbal ring 42 about pivots 45. In fact, so long as the gyroscope is free to precess about its vertical axis at a rate which corresponds, according to the laws of gyrodynamics to that set up by the torque exerted on the gimbal ring due to the hydraulic pressure exerted on vane 116 and arm 115, these pressures will not cause any appreciable displacement of the vane and arm but will effect any desired amount of steering motion without such displacement, the rate of precessing, and therefore the rate of turning of the craft, being proportional to the pressure on the vane and arm, which in turn may be arranged to be at least roughly proportioned to the displacement of the steering wheel from neutral. It will be observed that with this arrangement, steering response in the proper direction starts immediately upon displacement of the steering wheel from neutral, regardless of the immediate position of vane 116.

Gyroscope rotor drive means

The gyroscope rotor may be driven by any of a number of well known electrical or pneumatic means, power being derived from a unit 39 connected by suitable gearing to the vertical drive shaft 10, so that the rotation of the main propeller, whether effected by engine power or by aerodynamic forces in flight, will always insure functioning of the gyroscope.

In this embodiment there is illustrated the air jet method of propulsion mentioned above for the gyro rotor 40. A series of buckets 160 are formed peripherally about rotor 40, and a nozzle 161 is arranged to direct compressed air thereagainst throughout rotation. Nozzle 161 is supplied with air by a conduit 162 leading thereto through the hollow shaft 164 of fork 44, which also encompasses the flexible hydraulic supply pipes 127 and 129. Nozzle 161 may be supplied with compressed air from a compression pump 39 (Figure 1), continuously driven from rotor shaft 10; or preferably, this pump may be a vacuum pump for exhausting the air from casing 169 (Figure 12), and thereby permitting the air at atmospheric pressure supplied to nozzle 161 through duct 162 to form the air jet for driving the rotor. In this latter construction the lower end of sleeve 164 may be capped by an air-tight cap 375 through which the duct 162 and the flexible hoses 127 and 129 may be led. Preferably nozzle 161 is split laterally into two separate jets engaging buckets 160 near the opposite edges thereof in order to exert a righting effect on the gyroscope in case ring 42 becomes tilted, and preferably in this embodiment, because of the lack of torque required of the gyroscope in effecting steering, the axis 41 is coplanar with pivots 45, and the center of mass of the gyro assembly is at the intersection of the pivot line with the axis.

Servo mechanism operated by gyroscope

There is illustrated in Figure 12, and more especially in Figure 13, the means by which the gyroscope, in this second embodiment, effects control of the balance of torques. To accomplish this without requiring the gyroscope to exert appreciable torque, the displacement of the gyroscope relative to its housing is utilized to selectively control the opening of pneumatic ports to produce pressure differentials which move the member 301 which, as disclosed, effects the balancing of torques, or optionally may control another servo-mechanism (not shown) for effecting such balance. A follow-up linkage between this torque-balancing member and the housing of the gyroscope smooths out the action and prevents "hunting" by temporarily altering, in effect, the control heading in proportion to the movement of the torque-balancing member, but special provisions are made to gradually remove any such changes in control heading and to tend to keep the craft on a constant heading regardless of any sustained changes in the throttle and anti-torque settings.

As indicated in Figures 12 and 13, the airtight housing 169 within which the gyro assembly is encased, is pierced at two diametrically opposite points by two ports 311 and 312, preferably relatively long and shallow in cross-section (see Figure 12), which ports are connected to pneumatic cylinder 304 by means of flexible hose connections 309 and 310, respectively. Aside from the ports connected to these hoses, cylinder 304 is also provided with two permanently open bleed holes 305 and 306, one in each end of the cylinder. One end of the fork 44, which supports the gyroscope, is provided with projecting arms 110 to which a curved strip 314 is integrally attached, this strip being so shaped as to have at all points a very slight clearance only from the inner walls of housing 169. This strip is of such length that with all parts in their normal neutral positions, as illustrated in Figure 13, the strip approximately half covers each of the ports 311 and 312. Therefore as air is exhausted from housing 169 it will be partially replaced by air entering cylinder 304 through bleed hole 305 and moving through hose 309 and port 311, and by air entering cylinder 304 through bleed hole 306 and moving through hose 310 and port 312, as well as by air entering through jet 161. A partial vacuum will exist within cylinder 304, but so long as the opening of ports 311 and 312 exposed by strip 314 is the same, the pressure will be the same each side of piston 302 and there will be no tendency to move the piston. If the craft heading changes slightly, however, for instance to the left as the result of excessive engine torque, the gyroscope remaining parallel to its former heading will be displaced clockwise relative to the housing, thus acting to further close port 311 and further open port 312. This will result in an increase in the amount of air being exhausted from the right end of cylinder 304 through hose 310 and a decrease in the amount being exhausted from the left end through hose 309, therefore decreasing the air pressure right of piston 302 and increasing that left of it, causing the piston to move toward the right, thereby moving rod 301 to the right, which rod may be directly connected to throttle lever 53 like link 51 of Figure 5, or preferably connected to it by a linkage system illustrated in Figure 14 and hereinafter described. In either case this movement will result in decreasing the throttle setting and bringing the torques into balance.

If no provision were made to the contrary, however, piston 302 would keep moving to the right, not only until the torques were balanced but until they were overbalanced for a long enough time to effect return of the craft to its original heading, by which time they would be so far overbalanced as to cause a repetition of the cycle in the opposite direction. To avoid this rod 301 is connected to housing 169 by a followup linkage comprising arm 317, integral with rod 301, and arm 322, integral with housing 169, and a link mechanism pivotally connected to these two arms at 319 and 321, respectively. This link mechanism acts over any short period of time substantially like a fixed link connecting the two arms, and may be so considered in connection with the action to be first described. As previously described, leftward turning of the craft will cause rightward displacement of the gyroscope relative to its housing, which will give rise to rightward movement of rod 301, which through the followup linkage, above described, will cause simultaneous rightward rotation of housing 169 in proportion to the movement of rod 301, thus checking the rightward movement of rod 301 before the craft returns to its original heading, but not before the torques have been balanced, for until they are balanced the rightward displacement of the gyroscope relative to the craft will continue to increase, thereby continuing to increase the rightward displacement of rod 301. This corresponds to the action of the followup linkage employed on most automatic steering mechanism. The elongated shape of ports 311 and 312 still further serves to smooth out the action for small angular displacements of the craft.

*Mechanism for effecting automatic return to constant heading*

If the linkage 330—334 were one integral link, housing 169 would occupy one definite position for maximum throttle setting and a different definite position for minimum throttle setting and each change of throttle setting would cause a change in the control heading of the craft corresponding to the angular displacement of housing 169 between these limits. Arrangements are therefore provided for automatically slowly readjusting the effective length of linkage 330—334 to the length that will restore housing 169 to its original central neutral position for the average throttle setting pertaining for any considerable period of time. The action is such that if the anti-torque setting were, for instance, suddenly decreased, the mechanism of Figure 13 would act as hereinabove described to balance the torques, which would result in a rightward or clockwise displacement of housing 169 and corresponding leftward displacement of the control heading. Assuming the torque and anti-torque conditions to settle down to a substantial balance under these new conditions, the linkage 330—334 would gradually automatically lengthen until housing 169 was restored to its original central position and the control heading restored to its original direction.

This is accomplished by making the linkage 330—334 in two parts; one comprising the rod 330 integral with piston 331, and the other comprising hydraulic cylinder 320 integral with fork 334. A small amount of leakage past piston 331 is provided, for instance by means of the small hole 335 through the piston. This does not permit much of the hydraulic fluid that fills cylinder 320 to leak past the piston in a short period of time, even though the linkage be called upon to transmit considerable loads, but permits a large amount of leakage over a longer period of time even under slight pressures. Therefore the linkage acts substantially like a fixed length link for short periods of time giving instantaneous followup action, but will permit the linkage to gradually yield and change its length in accordance with any force which continues predominantly in any one direction over a period of time. A centralizing spring 336, acting on pin 337 integral with housing 169 and on stud 339 fixed to the frame of the craft, always tends to bring housing 169 back to its centralized position, if displaced therefrom by the followup linkage, and will therefore always exert a force tending to alter the length of linkage 330—334 to the length which will place housing 169 in its centralized position.

*Servo-mechanism for combined anti-torque and throttle control*

Figure 14 illustrates the preferred form of the linkage and control mechanism for combining the automatic movement of rod 301 (Figure 13) with that controlled by the pilot's throttle control lever 190 so as to give an effective throttle setting responsive to the pilot's setting of lever 190, but always producing an engine torque and anti-torque setting automatically in balance. This mechanism includes servo-motor means responsive to lever 190 for primarily setting anti-torque rudder 27, other servo-motor means for controlling the pitch of the anti-torque propeller, automatically brought into play when the anti-torque effect of rudder 27 is insufficient, and means automatically operated to alter both the throttle and anti-torque effect to produce balance, and to bring the anti-torque effects within the limits within which the engine torque can balance the anti-torque effects whenever those effects may temporarily be set outside the range within which the engine torque can balance them.

Lever 190 is the power control, shown arranged for use as a foot pedal, and is rockably mounted on pivot 191 fixed in the frame of the craft.

It will be recognized that this lever corresponds operationally to the foot throttle lever of an automobile. It may optionally be combined with a hand throttle control (not shown) for moving the same linkage, as is customary in automobiles, the combination of a hand lever and a foot pedal for the power control being particularly convenient on the helicopter, the foot pedal being used to control maneuvering in conditions such as take-off, landing, and hovering, and the hand lever being settable at the power level required for cruising. When no pressure is exerted on lever 190 by the operator, vertical arm 192 of lever 190 is held against the fixed frame piece 194 by spring 195, but it is shown in the middle of its traverse so that the various linkages may be illustrated in mean operating position. When the pilot wishes to increase the power, he depresses pedal 190 carrying toward the left in Figure 14 the pivot stud 196, which rockably connects vertical arm 192 of pedal 190 to vertical lever 197.

A horizontal link 199 is connected to vertical lever 197 at an intermediate point thereof by a pivot 200, and is positioned in response to the movement of rod 301 (Figures 13 and 14) due to being pivotally attached at 208 to a lever 202 pivoted to the frame of the craft at 201 and positioned by stud 251 integral with rod 301. Therefore except as rod 301 is displaced in response to changes in heading of the craft, as will be more fully discussed hereinafter, link 199 remains fixed and pivot 200 constitutes a fixed pivot.

Depressing pedal 190 causes vertical lever 197 to rock on pivot 200, thereby swinging to the right stud 204 in the lower end of lever 197. This stud 204 rides in a slot 205 in the upper end of a lever 206, and forces the lever to rock clockwise on a pivot 207 which is held relatively fixed by means described hereafter. A central slot 210 formed lengthwise through lever 206 receives slidably a stud 209 extending from valve slide rod 211. Clockwise rotation of lever 206 therefore acts to displace valve pistons 212 and 214 fixed to rod 211 to the right in valve cylinder 215. This serves to connect intake pipe 216, which supplies hydraulic pressure, to conduit 220, which in turn is connected into hydraulic power cylinder 219 to the right of piston 217. It also serves to connect hydraulic exhaust pipe 267 to conduit 221, which in turn is connected into cylinder 219 to the left of piston 217. Piston 217 is thereby traversed to the left, and acts through its double ended rod 222 and a cord 186 secured thereto, to displace rudder 27 counter-clockwise, which increases the anti-torque effect.

Traversal of piston 217 to the left will, however, carry pivot 207 toward the left also. Hence, as soon as piston 217 has moved leftward by an amount proportional to the valve-opening right- ward movement of stud 204, stud 209 will have been brought back to its initial position. This returns the hydraulic valve pistons 212 and 214 to closed position, stopping the movement of piston 217. Each displacement of stud 204 will therefore cause a proportional opposite displacement of piston 217 to take place under hydraulic power, resulting in proportional displacement of rudder 27, and holding it fixed in such displaced position as long as pedal 190 is held in this same depressed position. Obviously the letting up of control pedal 190 will cause just the reverse of the foregoing movements and decrease in anti-torque setting. In either direction of travel shoulders 218 adjoining piston 217 prevent it from traveling far enough to close the cylinder ports.

The right hand section of cord 186 is wrapped around and attached to pulley 241 so that displacement of the cord positively rotates the pulley. Integral with the pulley is a cam 242 which, as described below, acts to control the throttle lever 53. The contour of the cam may be made such that the change in throttle setting caused by any given displacement of the cam will cause a change in engine power approximately correct in amount to compensate for the change in anti-torque effect produced under normal flight conditions by the corresponding displacement of rudder 27. Any amount by which these effects fail to balance will cause changes in craft heading which will act in a manner similar to that previously described in connection with Figure 13, to vary the throttle setting and anti-torque setting so as to produce a perfect balance. These changes of heading will only have to be sufficient to compensate for the amounts by which cam 242 falls short of prefectly accomplishing its purpose, instead of by the amounts necessary to accomplish the entire work of cam 242, and hence such changes of heading will be very slight.

Cam 242 controls the throttle 53 through a cam roller 244 mounted on a lever 245 which is pivoted to the frame of the machine at 246, and is pressed against cam 242 by the action of a spring 247. Lever 245 is pivotally connected to the lower end of a lever 249 by stud 250. The upper end of lever 249 may be connected by stud 251 to rod 301, which is reciprocated by pneumatic cylinder 304 in response to displacements of the gyroscope relative to the craft, as previously described and illustrated in Figure 13. Lever 249 is pivotally connected at 254 to intermediate link 255, which in turn is rockably connected at 256 to a throttle actuating lever 257. The upper end of lever 257 is normally centralized by a torsion spring 274 mounted on fixed stud 275 and located by fixed stud 276 so as to yieldably resist displacement of stud 259 in lever 257 from its central position, while the lower end attaches, by a pin 260, to the throttle lever 53.

Thus, when pedal 190 is depressed, causing counter-clockwise displacement of rudder 27 and of cam 242, as previously described, roller 244 will be brought against a lower point on the cam, permitting spring 247 to rock lever 245 counter-clockwise on its pivot 246; and since pivot 251 will remain fixed unless some change in heading of the craft takes place, this will cause lever 249 to rock clockwise on pivot 251, drawing link 255 to the left, rocking lever 257 about centralized stud 259 as a center, and rocking throttle lever 53 counter-clockwise to increase engine power. If the repositioning of throttle lever 53 does not provide exactly the power increase required to balance the anti-torque effect, a change of craft heading will result, displacing point 251 in one direction or the other. A displacement to the left would serve to further increase throttle setting. It would also decrease anti-torque setting by rocking lever 202 to the left thus causing leftward displacement of stud 204 the same as letting up of pedal 190. Through the action of cam 242 this will in turn decrease throttle setting but not by as much as the same movement of rod 301 increased by the direct connection above described. Therefore, any displacement in the heading of the craft will cause an immediate change in throttle setting altering engine torque in the direction to stop such heading change, followed immediately by a change in anti-torque setting also aimed to check the change of heading but partially canceling the initial change in throttle setting. This sequence will give very quick correction of heading changes by instantaneous adjustment of engine torque, but by the time this change of torque has been reflected in change of speed of rotor slip-stream and would tend to have a counter effect on the anti-torque surfaces, these surfaces have been adjusted to supplement the original engine torque effect, in fact, to take over a large part of the torque correction function initially handled by throttle adjustment. This gives an automatic smoothing-out action and sets up a final torque correction condition jointly effected by the throttle and the anti-torque settings, thus minimizing any tendency for increased slip-stream due to increased throttle to cancel the corrective effect of engine torque by causing a counter-balancing effect on the anti-torque surfaces.

Power cylinder 219 is made of such length that piston 217 will reach the ends of its travel as determined by stops 218 when rudder 27 reaches the extremities of its desirable range of movement. So long as piston 217 is free to travel, valve slide 211 can not be displaced very far from its central position, since any movement of stud 204 tending to create such displacement is immediately followed by an opposite movement of stud 207 which restores the original position of moving slide 211.

However, when piston 217 reaches the left end of its travel, corresponding to the maximum anti-torque setting of rudder 27, stud 207 can not travel any further to the left. Thereafter, further rightward travel of stud 204 caused by further depressions of pedal 190, will cause proportional further movement of valve slide 211 to the right, causing disc 261 on the end of the slide, to engage slotted lever 262 and rock it counter-clockwise on stud 264 against the tension of spring 265. Rocking lever 262, through a slidable pivot 263, traverses valve slide 266 to the right, which admits hydraulic pressure from pressure line 268 to the right of piston 269 in power cylinder 270, and connects the left end of power cylinder 270 to exhaust line 267, thus moving piston 269 and link 181 connected to it, to the left. Piston 269 is prevented from assuming an inoperative position at either end of the cylinder 270 by stops 272. It will be observed that the movement of the power piston 269 to the left serves to return the valve slide 269 to the left, restricting piston movement proportionately to the control movement producing it, just as in the case of the other similar servomotor comprising cylinders 215 and 219.

This leftward movement of link 181 acts the same as the rightward movement of link 181 in Figure 9 to increase the pitch of propeller 21 and open louvers 20. Whenever the control setting returns valve slide 211 close to its neutral position, due either to at least partial letting up of control lever 190 or to the actions of link 199 described below, spring 265 carries slide 266 to its left position, causing return of piston 269 to the extreme right, and consequent return of the auxiliary propeller to zero pitch and closing of the louvers.

When throttle lever 53 reaches either end of its travel and engages stop 170 or stop 171, if the turning of the craft thus bringing the lever to the end of its travel has not been checked, the anti-torque is respectively greater or less than the engine torque can balance. However, under such circumstances the yielding of spring 274 permits the traverse of rod 301 to continue, and the increased displacement thereof continues to alter the anti-torque effect through the action of lever 202 and link 199 so as to bring the anti-torque effect into balance with the throttle setting.

It will be observed that cam 242 acts to approximately equalize engine power and anti-torque effects only for normal flight conditions and only when rudder 27 is being used as the selectively adjusted anti-torque means. Since the propeller 21 is not expected to be required for anti-torque during normal flight, obviously any arrangement corresponding to cam 242 provided to function selectively with readjustment of the propeller would have to be designed to balance for a different assumed set of flight conditions. While means could be provided for operating in conjunction with cam 242 to give a combined effect aimed at balancing under typical conditions calling for use of the anti-torque propeller 21, such conditions are in general so varied, usually involving takeoff, landing, or hovering, that a few degrees change of heading is not apt to be of importance, and can be promptly compensated for by use of the steering wheel, which is necessarily in use at that time. Hence, it is not considered necessary to provide any such means in conjunction with the anti-torque propeller, and none has been shown in the present application.

SUMMARY

In summary, it will be seen that I have provided means to eliminate the difficulty in counterbalancing rotor torque which has previously been encountered in vehicles of the helicopter type. During normal flight the correction is obtained through the use of curved anti-torque surfaces, both fixed and movable. During abnormal conditions, such as those obtaining in gusty weather, in hovering, or while ascending or descending approximately vertically, additional anti-torque is supplied by a normally concealed and shielded auxiliary propeller which is automatically brought into action.

A balance is maintained between rotor torque and the counterbalancing means by a gyroscopic unit which instantly corrects for undesired heading changes by exercising a throttle control over the rotor torque, or combined throttle and anti-torque controls, balancing the torques and eventually setting up a torque unbalance which will restore the craft to the original heading. Steering is effected through causing the gyroscope to precess through the desired angle of turn. Power is changed by altering the anti-torque setting to create a torque unbalance to meet which the gyro unit will immediately vary the engine power, or alternatively the alteration of anti-torque setting may also act mechanically to effect a change in throttle setting. If the range of engine power is not sufficient to balance the new anti-torque setting automatic means are provided to bring the anti-torque setting into proper range for the engine to balance.

Servo mechanisms may be provided for handling any or all of the controlling functions requiring the exercise of any appreciable amount of force, and when employed they may be equipped with suitable followup mechanisms to smooth out and suitably limit their action. Unintended changes in craft heading may be prevented from continuing by utilizing a special form of automatically readjustable followup mechanism.

Thus the rotor torque of a helicopter may be balanced entirely automatically, with only slight and temporary deviations from desired craft heading being permitted to occur. By constructing the gyroscope with the degree of refinement customary in automatic pilots for aircraft, automatic steering may be secured with an accuracy in maintaining course comparable to that at present obtained with such automatic pilots. However, with a gyroscope constructed with an accuracy more nearly comparable to that of a bicycle wheel, effective automatic balancing of torques may be secured and the craft maintained substantially on any desired course without the exercise of any greater amount of steering action than is customarily exercised in driving an automobile.

While the various alternatives of construction disclosed have been described as embodied in two embodiments, many different combinations of the elements of these two embodiments are possible; such, for instance, as substituting the hydraulic precession mechanism of Figure 10 for the mechanical form shown in Figure 5; incorporating into the second embodiment the mechanism for caging the gyroscope, as illustrated in Figure 7, and/or the mechanism for exercising direct mechanical control of the throttle as illustrated in Figure 9, together with the mechanism for automatically enabling and disabling these mechanisms on landing and taking off; incorporating into the first embodiment the mechanism for automatically readjusting the anti-torque setting if it goes outside the limits corresponding to maximum or minimum engine power, and the like.

I claim:

1. In an aircraft having a power operated sustaining rotor exerting a turning moment on said craft, means for controlling the magnitude of the turning moment so exerted and means for exerting a counter turning moment to that so exerted upon the craft; the combination of a control device automatically responsive to changes in the heading of the craft, and means controlled by said device for actuating said controlling means.

2. In an aircraft having a power operated sustaining rotor exerting a turning moment on said craft, means for controlling the magnitude of the turning moment so exerted and means for exerting a counter turning moment to that so exerted upon the craft; the combination of a control device comprising a gyroscope responsive to changes in the heading of the craft, and means controlled by said gyroscope for actuating said controlling means.

3. In an aircraft having a power operated sustaining rotor exerting a turning moment on said craft, means for controlnlg the magnitude of the turning moment so exerted and means for exerting a counter turning moment to that so exerted upon the craft; the combination of a control device comprising a statically unstable gyroscope assembly including a gyroscope freely pivoted for displacement about an axis normally substantially vertical and about an axis normally substantially horizontal; the center of gravity of said assembly being above the said horizontal axis, and means controlled by said gyroscope assembly for actuating said controlling means.

4. In an aircraft having a power operated sustaining rotor exerting a turning moment on said craft, means for controlling the power transmitted to said rotor, and means for exerting a counter turning moment to that so exerted upon the craft; the combination of a control device automatically responsive to changes in the heading of the craft, and means controlled by said device for actuating said power controlling means.

5. In an aircraft having a power operated sustaining rotor exerting a turning moment on said craft, means for controlling the power transmitted to said rotor, and means for exerting a counter turning moment to that so exerted upon the craft; the combination of a control device comprising a gyroscope responsive to changes in the heading of the craft, and means controlled by said gyroscope for actuating said power controlling means.

6. In an aircraft having a sustaining rotor exerting a turning moment on said craft, power drive means for said rotor, an adjustable throttle for said power drive means, and means for exerting a counter turning moment to that exerted upon the craft by said rotor; the combination of a control device automatically responsive to changes in the heading of the craft, and means controlled by said device for adjusting said throttle.

7. In an aircraft having a sustaining rotor exerting a turning moment on said craft, power drive means for said rotor, an adjustable throttle for said power drive means, and means for exerting a counter turning moment to that exerted upon the craft by said rotor; the combination of a control device comprising a gyroscope responsive to changes in the heading of the craft, and means controlled by said gyroscope for adjusting said throttle.

8. In an aircraft having a sustaining rotor exerting a turning moment on said craft, power drive means for said rotor, an adjustable throttle for said power drive means, and means for exerting a counter turning moment to that exerted upon the craft by said rotor; the combination of a control device comprising a statically unstable gyroscope assembly including a gyroscope freely pivoted for displacement about an axis normally substantially vertical and an axis normally substantially horizontal; the center of gravity of said assembly being above said horizontal axis, and means controlled by said gyroscope assembly for adjusting said throttle.

9. In an aircraft having a power operated sustaining rotor exerting a turning moment on said craft, and adjustable means for exerting a counter turning moment on said craft; the combination of means for controlling the power transmitted to the rotor and means for setting said power controlling means comprising means for adjusting the means exerting a counter turning moment on said craft, and means automatically responsive to changes in craft heading for adjusting said power controlling means to bring the turning moment exerted by said rotor into balance with the counter turning moment produced by adjustment of the means exerting such counter turning moment.

10. In an aircraft having a sustaining rotor, power operated driving means therefor, and means for controlling the torque output of said driving means; the combination of means responsive to changes in the heading of the craft for adjusting said controlling means, torque counterbalancing means, and means for controlling said torque counterbalancing means to vary the torque counterbalancing force exerted thereby.

11. In an aircraft having a sustaining rotor, a prime mover for driving said rotor, and torque counterbalancing means including an anti-torque propeller positively driven in synchronism with said rotor, the combination with means for varying the effect of said torque counterbalancing means to effect a change in craft heading, of means responsive to changes in craft heading varying the output level of said prime mover to restore rotor torque into balance with said varied counterbalancing torque.

12. In an aircraft having a sustaining rotor, a throttle controlled prime mover for driving said rotor, plural torque counterbalancing means including a movable aerodynamically effective antitorque surface and an anti-torque airscrew selectively operable and positively driven synchronously with said rotor, the combination of means for varying the output level of said prime mover, comprising means for controlling said anti-torque means to effect an unbalance with the torque of said rotor, and means responsive to heading changes of said craft for restoring said balance through controlling the throttle of said prime mover.

13. In an aircraft having a power driven sustaining rotor, a rotor prime mover, throttle control means for said prime mover, rotor torque counterbalancing means including a movable anti-torque surface and an anti-torque airscrew positively driven with said rotor normally enclosed within said craft; the combination of gyroscopic means responsive to craft heading changes for positioning said throttle control means, and servo means for smoothly restoring said gyroscopic and throttle control means to an initial position after displacement therefrom.

14. In an aircraft having a power operated sustaining rotor exerting a turning moment on said craft, means for controlling the magnitude of the turning moment so exerted, and means for exerting a counter turning moment on the craft; the combination of a selectively settable control device automatically responsive to changes in the heading of the craft, means controlled by said device for actuating said controlling means to maintain a selected heading of the craft, and steering means under the control of the operator for selectively resetting said control device to cause the same to render said controlled means effective to actuate said controlling means to maintain any other selected heading of the craft.

15. In an aircraft having a power operated sustaining rotor exerting a turning moment on said craft, means for controlling the magnitude of the turning moment so exerted, and means for exerting a counter turning moment on the craft; the combination of a gyroscope, means controlled by said gyroscope for actuating said controlling means to maintain a selected heading of the craft, and steering means under the control of the operator for causing said gyroscope to precess and thereby to render said controlled means effective to actuate said controlling means to maintain any other selected heading of the craft.

16. In an aircraft having a power operated sustaining rotor exerting a turning moment on said craft and means for exerting a counter turning moment on the craft; the combination of a gyroscope, means controlled by said gyroscope for balancing the turning moments thus exerted upon the craft with respect to a selected heading, and steering means under the control of the operator for causing said gyroscope to precess and thereby to render said last mentioned means effective to balance the turning moments exerted upon the craft with respect to any other selected heading comprising a manually displaceable steering member having a releasable connection with said gyroscope, and means effective to normally maintain said connection released; said means being responsive to said member upon displacement thereof to reconstitute said connection.

17. In an aircraft having a power operated sustaining rotor exerting a turning moment on said craft, means for controlling the magnitude of the turning moment so exerted, and means for exerting a counter turning moment on the craft; the combination of a gyroscope, means controlled by said gyroscope for actuating said controlling means to maintain a selected heading of the craft, and steering means under the control of the operator for causing said gyroscope to precess and thereby to render said controlled means effective to actuate said controlling means to maintain any other selected heading of the craft, comprising a manually displaceable steering member, means for applying hydraulic pressure to said gyroscope to cause precession thereof, and means controlled by said steering member for varying the magnitude of the hydraulic pressure applied by said last mentioned means.

18. In an aircraft having a sustaining rotor, a throttle controlled prime mover for driving said rotor, plural torque counterbalancing means including a movable aerodynamically effective antitorque surface and an anti-torque airscrew selectively operable and positively driven synchronously with said rotor, the combination of means for varying the output level of said prime mover, comprising means for controlling said anti-torque means to effect an unbalance with the torque of said rotor, means responsive to heading changes of said craft for restoring said balance through controlling the throttle of said prime mover, and steering means for controlling said heading change responsive means to effect changes in craft heading.

19. In an aircraft having a sustaining rotor, power operated driving means therefor, and throttle means for controlling said driving means; the combination of torque counter-balancing means, a gyroscope automatically displaceable with respect to the craft upon changes in the heading thereof, operating connections between said gyroscope and said throttle means whereby said throttle means will be automatically adjusted upon displacement of said gyroscope with respect to the craft, and steering control means comprising means for causing said gyroscope to precess in one direction or the other, selectively.

20. In an aircraft having a sustaining rotor, a prime mover for said rotor, throttle control means for said prime mover, a steering control member, and rotor torque counter-balancing means including a movable aerodynamically effective anti-torque surface and an auxiliary power operated anti-torque airscrew, the combination of steering control means including a gyroscopic unit actuated in response to changes of craft heading, linkage means whereby said gyroscopic unit may move said throttle control means in response to changes of craft heading due to torque unbalance in a direction to overcome such unbalance, and means for steering said craft comprising linkage means whereby said steering control member may exert pressure on said gyroscopic unit effective to permit torque unbalance in one direction and render said unit ineffective to restore said craft to its original heading after release of said member.

21. In an aircraft having a sustaining rotor, power operated driving means therefor, throttle means for controlling said driving means, selectively operable torque counterbalancing means, and a steering control member, the combination of means for steering said craft through control of torque balance between said rotor and said torque counter-balancing means comprising gyroscopic means responsive to changes of heading for positioning said throttle means to create restoring torque unbalance, a heading means operable by said steering control member upon displacement thereof from a neutral position to permit a torque unbalance in one direction tending to turn the craft in the desired direction.

22. In an aircraft, a control unit comprising a gyroscope freely pivoted for displacement about an axis normally substantially vertical and about an axis normally substantially horizontal, adjustable stop means for preventing pivotal movement of said gyroscope about said horizontal axis, means for adjusting said stop means to effective and to ineffective positions, and means engageable with the ground upon landing of said craft for controlling said adjusting means.

23. In an aircraft, a prime mover for driving said craft, an adjustable power control for said prime mover, a manually adjustable member, connecting means between said member and said power control adjustable to effective and to ineffective conditions, and means engageable with the ground upon landing of said craft for adjusting said connecting means to effective condition.

24. In an aircraft, a prime mover for driving said craft, an adjustable power control for said prime mover, an automatic control unit having an operating connection with said power control, a manually adjustable member, connecting means between said member and said power control adjustable to effective and to ineffective conditions, means for rendering said automatic control unit ineffective to operate said power control, and means engageable with the ground upon landing of said craft for actuating said last named means and for adjusting said connecting means to effective condition.

25. In an aircraft having a sustaining rotor and power operated driving means therefor; the combination with torque counterbalancing means comprising an adjustable surface exposed to aerodynamic forces effective in normal flight, of auxiliary torque counterbalancing means comprising a selectively operable, power driven airscrew, and control mechanism for said torque counter-balancing means and said auxiliary torque counter-balancing means comprising an element adjustable through a predetermined range of moveement, means responsive to said element through one portion only of said range of movement for adjusting said torque counter-balancing means, and means responsive to said element upon adjustment thereof beyond said portion of said range of movement for causing said auxiliary torque counter-balancing means to exert aerodynamic thrust.

26. The combination with an aircraft having a fuselage and a sustaining rotor, of plural means for counter-balancing rotor torque, comprising a movable anti-torque surface and an auxiliary power driven propeller enclosed during normal forward flight within the fuselage of said craft, means for controlling said surface to alter the anti-torque effect thereof, means for controlling said propeller to alter the torque counter-balancing effect thereof, and unitary means for selectively operating either one or the other of said controlling means.

27. The combination with an aircraft having a fuselage and a power operated sustaining rotor, of means for counterbalancing the turning moment exerted upon the craft thereby, comprising an auxiliary power operated airscrew mounted within the fuselage of said craft and disposed in a plane generally perpendicular to that of the rotor, means for sealing said auxiliary airscrew within said fuselage, and means operable to increase the velocity of the airstream produced by said auxiliary airscrew and simultaneously to unseal the same.

28. The combination with an aircraft having a fuselage and a power operated sustaining rotor, of means for counterbalancing the turning moment exerted upon the craft thereby, comprising an auxiliary airscrew disposed within said fuselage and driven synchronously with said rotor in a plane generally perpendicular to the plane of rotation thereof; means for sealing said airscrew within said fuselage including louvers having slats individually pivotally mounted, and means for increasing the pitch of said auxiliary airscrew and simultaneously opening said louvers.

29. In an aircraft having a fuselage and a power operated sustaining rotor exerting a turning moment on said fuselage; means for exerting a counter turning moment on said fuselage comprising an auxiliary power-operated airscrew mounted within said fuselage and disposed in a plane generally perpendicular to that of the rotor, means for closing said auxiliary airscrew within the fuselage including closure means disposed in the path of the airstream produced by said auxiliary airscrew and movable by said airstream to a position of minimum interference therewith, and means automatically effective upon cessation of said airstream to move said closure means into position to close said airscrew within the fuselage.

30. In an aircraft having a power operated sustaining rotor exerting a turning moment on the craft; the combination with torque counterbalancing devices comprising an adjustable surface exposed to aerodynamic forces in flight and an auxiliary adjustable pitch propeller, of control mechanism for said torque counterbalancing devices including an element adjustable through a predetermined range of movement, means responsive to said element upon adjustment thereof through a first portion only of said range of movement for adjusting said adjustable surface, and means responsive to said element upon adjustment thereof beyond said first portion of said range of movement for adjusting the pitch of said propeller.

31. In an aircraft having a sustaining rotor, driving means for said rotor including a motor in said craft and means for transmitting power from said motor to said rotor and thereby exerting a turning moment on said craft, and anti-torque means for exerting a turning moment counter to that exerted upon the craft by said driving means; the combination of an adjustable power control member, means controlled by said member for concurrently adjusting said driving means and said anti-torque means, a control device automatically responsive to changes in the heading of the craft, and means controlled by said device for independently controlling the relative adjustments of said driving means and said anti-torque means.

32. The combination with an aircraft having a fuselage provided with an airstream discharge opening, and a power operated sustaining rotor, of means for counterbalancing the turning moment exerted upon the craft thereby, comprising an auxiliary power operated airscrew mounted within the fuselage of said craft and discharging through said opening; said opening being so oriented as to cause the discharge to offset the turning moment, closure means for said opening adjustable to fair the same aerodynamically with respect to the surface of said fuselage, and means operable to increase the velocity of the airstream produced by said auxiliary airscrew and to concomitantly cause opening of said closure means.

33. The combination with an aircraft having a fuselage and a power operated sustaining rotor, of means for counterbalancing the turning moment exerted upon the craft thereby, comprising a tunnel extending substantially transversely through the fuselage, an auxiliary power operated airscrew mounted within said tunnel, means for controlling the velocity of the airstream produced by said airscrew, closure means for each end of said tunnel each forming, when closed, substantially a smooth continuation of the surface of the fuselage, and forming, when partially opened, means for deflecting air moving rearwardly outside the fuselage to a more nearly transverse direction of travel through said tunnel, and thence more nearly rearwardly again as it leaves said fuselage, closure control means for selectively opening or closing said closure means, and means for concomitantly operating said velocity control means to increase said velocity and operating said closure control means to open said closure means.

34. The combination with an aircraft having a fuselage and a power operated sustaining rotor, of means for counterbalancing the turning moment exerted upon the craft thereby, comprising a tunnel extending through the fuselage, an auxiliary power operated airscrew mounted within said tunnel, means for controlling the velocity of the airstream produced by said airscrew, selectively operable closure means for said tunnel forming, when closed, substantially a smooth continuation of the surface of the fuselage, closure control means for selectively opening or closing said closure means, and means for concomitantly operating said velocity control means to increase said velocity and operating said closure control means to open said closure means.

HAROLD T. AVERY.